(12) United States Patent
Barsness et al.

(10) Patent No.: US 9,172,628 B2
(45) Date of Patent: Oct. 27, 2015

(54) DYNAMIC DISTRIBUTION OF NODES ON A MULTI-NODE COMPUTER SYSTEM

(71) Applicant: International Business Machines Corporation, Armonk, NY (US)

(72) Inventors: Eric L. Barsness, Pine Island, MN (US); David L. Darrington, Rochester, MN (US); Amanda Randles, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 13/786,750

(22) Filed: Mar. 6, 2013

(65) Prior Publication Data

US 2013/0185731 A1 Jul. 18, 2013

Related U.S. Application Data

(63) Continuation of application No. 11/955,067, filed on Dec. 12, 2007, now abandoned.

(51) Int. Cl.
| | | |
|---|---|---|
| *G06F 15/177* | (2006.01) | |
| *G06F 15/173* | (2006.01) | |
| *G06F 15/76* | (2006.01) | |
| *G06F 9/46* | (2006.01) | |
| *H04L 12/26* | (2006.01) | |
| *G06F 9/38* | (2006.01) | |
| *G06F 9/50* | (2006.01) | |
| *G06F 15/80* | (2006.01) | |

(52) U.S. Cl.
CPC .............. *H04L 43/16* (2013.01); *G06F 9/3885* (2013.01); *G06F 9/5083* (2013.01); *G06F 15/80* (2013.01)

(58) Field of Classification Search
CPC .............. G06F 9/3885–9/3897; G06F 9/5083; G06F 15/80–15/8092
USPC .............. 709/201–203, 223–226; 712/10–23; 718/104
See application file for complete search history.

(56) References Cited

U.S. PATENT DOCUMENTS

| | | | |
|---|---|---|---|
| 4,313,036 A | 1/1982 | Jabara et al. | |
| 4,766,534 A | 8/1988 | DeBenedictis | |
| 4,897,874 A | 1/1990 | Lidinsky et al. | |
| 6,161,152 A * | 12/2000 | Garg et al. | 710/46 |
| 6,366,945 B1 | 4/2002 | Fong et al. | |
| 6,427,152 B1 | 7/2002 | Mummert et al. | |
| 6,438,553 B1 | 8/2002 | Yamada | |
| 6,986,139 B1 * | 1/2006 | Kubo | 718/105 |
| 7,555,566 B2 * | 6/2009 | Blumrich et al. | 709/249 |
| 7,761,557 B2 * | 7/2010 | Fellenstein et al. | 709/224 |
| 7,840,779 B2 * | 11/2010 | Archer et al. | 712/16 |
| 8,117,288 B2 * | 2/2012 | Bhanot et al. | 709/220 |

(Continued)

*Primary Examiner* — David Lazaro
*Assistant Examiner* — Julian Chang
(74) *Attorney, Agent, or Firm* — Martin & Associates, LLC; Bret J. Petersen (57) ABSTRACT

I/O nodes are dynamically distributed on a multi-node computing system. An I/O configuration mechanism located in the service node of a multi-node computer system controls the distribution of the I/O nodes. The I/O configuration mechanism uses job information located in a job record to initially configure the I/O node distribution. The I/O configuration mechanism further monitors the I/O performance of the executing job to then dynamically adjusts the I/O node distribution based on the I/O performance of the executing job.

12 Claims, 8 Drawing Sheets

(56) References Cited

U.S. PATENT DOCUMENTS

| | | |
|---|---|---|
| 8,127,273 B2* | 2/2012 | Barsness et al. ............ 717/107 |
| 8,151,245 B2* | 4/2012 | Oberlin et al. ............. 717/121 |
| 2002/0010840 A1* | 1/2002 | Barroso et al. ............. 711/141 |
| 2002/0073164 A1* | 6/2002 | Hagersten et al. .......... 709/215 |
| 2002/0087807 A1* | 7/2002 | Gharachorloo et al. ..... 711/141 |
| 2004/0024859 A1 | 2/2004 | Bloch et al. |
| 2004/0081155 A1* | 4/2004 | Bhanot et al. .............. 370/392 |
| 2004/0103218 A1* | 5/2004 | Blumrich et al. ........... 709/249 |
| 2004/0148472 A1* | 7/2004 | Barroso et al. ............. 711/141 |
| 2005/0038834 A1 | 2/2005 | Souder et al. |
| 2005/0097103 A1* | 5/2005 | Zane et al. ..................... 707/6 |
| 2005/0131993 A1* | 6/2005 | Fatula, Jr. ................... 709/202 |
| 2005/0268299 A1* | 12/2005 | Picinich et al. ............. 718/100 |
| 2006/0015505 A1* | 1/2006 | Henseler et al. .............. 707/10 |
| 2006/0026161 A1* | 2/2006 | Henseler ....................... 707/10 |
| 2006/0041644 A1* | 2/2006 | Henseler ..................... 709/220 |
| 2006/0168584 A1* | 7/2006 | Dawson et al. ............. 718/104 |
| 2007/0005914 A1 | 1/2007 | Thompson et al. |
| 2007/0011485 A1* | 1/2007 | Oberlin et al. ................ 714/4 |
| 2007/0078960 A1* | 4/2007 | Dawson et al. ............. 709/223 |
| 2007/0101000 A1* | 5/2007 | Childress et al. ........... 709/226 |
| 2007/0198750 A1* | 8/2007 | Moilanen ...................... 710/6 |
| 2009/0049114 A1* | 2/2009 | Faraj .......................... 709/201 |
| 2009/0083746 A1* | 3/2009 | Katsumata .................. 718/103 |
| 2009/0259713 A1* | 10/2009 | Blumrich et al. ........... 709/201 |
| 2012/0192152 A1* | 7/2012 | Oberlin et al. ............. 717/121 |
| 2012/0311299 A1* | 12/2012 | Blumrich et al. ............. 712/16 |

* cited by examiner

DYNAMIC DISTRIBUTION OF NODES ON A MULTI-NODE COMPUTER SYSTEM

BACKGROUND

1. Technical Field

The disclosure and claims herein generally relate to multi-node computer systems, and more specifically relate to dynamic distribution of compute nodes with respect to I/O nodes on a multi-node computer system.

2. Background Art

Supercomputers and other multi-node computer systems continue to be developed to tackle sophisticated computing jobs. One type of multi-node computer system is a massively parallel computer system. A family of such massively parallel computers is being developed by International Business Machines Corporation (IBM) under the name Blue Gene. The Blue Gene/L system is a high density, scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

Computer systems such as Blue Gene have a large number of nodes, each with its own processor and local memory. The nodes are connected with several communication networks. One communication network connects the nodes in a logical tree network. In the logical tree network, the Nodes are connected to an input-output (I/O) node at the top of the tree.

In Blue Gene, there are 2 compute nodes per node card with 2 processors each. A node board holds 16 node cards and each rack holds 32 node boards. A node board has slots to hold 2 I/O cards that each have 2 I/O nodes. Thus, fully loaded node boards have 4 I/O nodes for 32 compute nodes. The nodes on two node boards can be configured in a virtual tree network that communicate with the I/O nodes. For two node boards there may be 8 I/O nodes that correspond to 64 compute nodes. If the I/O nodes slots are not fully populated, then there could be 2 I/O nodes for 64 compute nodes. Thus the distribution of I/O nodes to compute nodes may vary between 1/64 and 1/8. Thus, the I/O node to compute node ratios can be defined as 1/8, 1/32, 1/64 or 1/128 (IO/compute). In the prior art, the distribution of the I/O nodes is static once a block is configured.

The Blue Gene computer can be partitioned into multiple, independent blocks. Each block is used to run one job at a time. A block consists of a number of 'processing sets' (psets). Each pset has an I/O node and a group of compute nodes. The compute nodes run the user application, and the I/O nodes are used to access external files and networks.

With the communication networks as described above, applications or "jobs" loaded on nodes execute on a fixed I/O to compute node ratio. Without a way to dynamically distribute the I/O nodes to adjust the ratio of IO to compute nodes based on the I/O characteristics of work being performed on the system, multi-node computer systems will continue to suffer from reduced efficiency of the computer system.

BRIEF SUMMARY

An apparatus and method is described for dynamic distribution of compute nodes versus I/O nodes on a multi-node computing system. An I/O configuration mechanism located in the service node of a multi-node computer system controls the distribution of the I/O nodes. The I/O configuration mechanism uses job information located in a job record to initially configure the I/O node distribution. The I/O configuration mechanism further monitors the I/O performance of the executing job to then dynamically adjust the I/O node distribution based on the I/O performance of the executing job.

The description and examples herein are directed to a massively parallel computer system such as the Blue Gene architecture, but the claims herein expressly extend to other parallel computer systems with multiple processors arranged in a network structure.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

The description and claims herein are directed to a method and apparatus for dynamic distribution of compute nodes versus I/O nodes on a multi-node computing system. An I/O configuration mechanism located in the service node of a multi-node computer system controls the distribution of the I/O nodes. The I/O configuration mechanism uses job information located in a job record to initially configure the I/O node distribution. The I/O configuration mechanism further monitors the I/O performance of the executing job to then dynamically adjust the I/O node distribution based on the I/O performance of the executing job. The examples herein will be described with respect to the Blue Gene/L massively parallel computer developed by International Business Machines Corporation (IBM).

Figure 1:
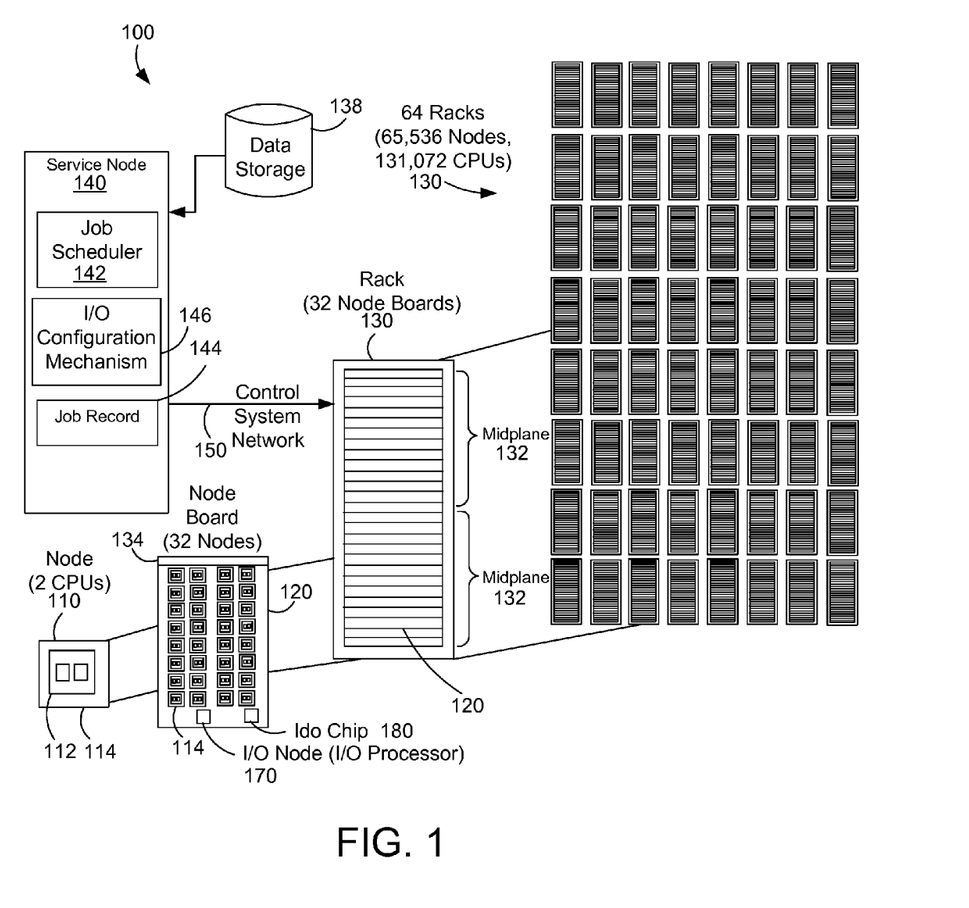
FIG. 1 is a block diagram of a massively parallel computer system.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards× 32 nodes×2 CPUs).

The Blue Gene/L computer system structure can be described as a compute node core with an I/O node surface, where communication to 1024 compute nodes 110 is handled by each I/O node 170 that has an I/O processor connected to the service node 140. The I/O nodes 170 have no local storage. The I/O nodes are connected to the compute nodes through the logical tree network and also have functional wide area network capabilities through a gigabit Ethernet network (See FIG. 2 below). The gigabit Ethernet network is connected to an I/O processor (or Blue Gene/L link chip) in the I/O node 170 located on a node board 120 that handles communication from the service node 160 to a number of nodes. The Blue Gene/L system has one or more I/O nodes 170 connected to the node board 120. The I/O processors can be configured to communicate with 8, 32 or 64 nodes. The service node uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 communicates through the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node.

The service node includes a job scheduler 142 for allocating and scheduling work and data placement on the compute nodes. The job scheduler 142 loads a job record 144 from data storage 138 for placement on the compute nodes. The job record 144 includes a job and related information as described more fully below. The service node further includes an I/O configuration mechanism 146 that dynamically distributes I/O nodes on a multi-node computing system. The I/O configuration mechanism 146 uses job information located in the job record 144 to initially configure the I/O node distribution. The I/O configuration mechanism further monitors the I/O performance of the executing job to then dynamically adjust the I/O node distribution based on the I/O performance of the executing job.

Figure 2:
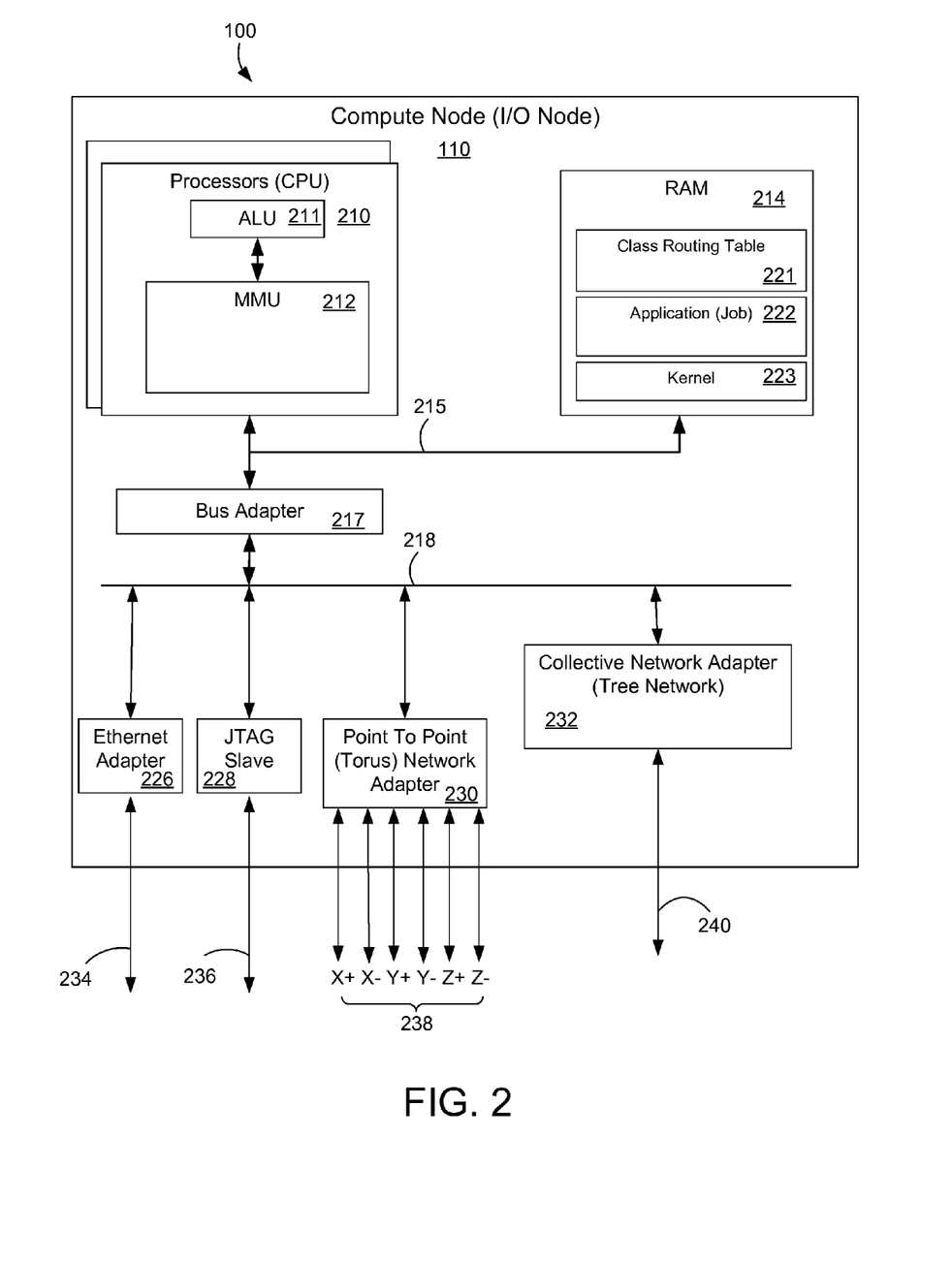
FIG. 2 is a block diagram of a compute node in a massively parallel computer system.

FIG. 2 illustrates a block diagram of an exemplary compute node as introduced above. FIG. 2 also represents a block diagram for an I/O node, which has the same overall structure as the compute node. A notable difference between the compute node and the I/O nodes is that the Ethernet adapter 226 is connected to the control system on the I/O node but is not used in the compute node. The compute node 110 of FIG. 2 includes a plurality of computer processors 210, each with an arithmetic logic unit (ALU) 211 and a memory management unit (MMU) 212. The processors 210 are connected to random access memory ('RAM') 214 through a high-speed memory bus 215. Also connected to the high-speed memory bus 214 is a bus adapter 217. The bus adapter 217 connects to an extension bus 218 that connects to other components of the compute node.

Stored in RAM 214 is a class routing table 221, an application program (or job) 222, an operating system kernel 223. The class routing table 221 stores data for routing data packets on the collective network or tree network as described more fully below. The application program is loaded on the node by the control system to perform a user designated task. The application program typically runs in a parallel with application programs running on adjacent nodes. The operating system kernel 223 is a module of computer program instructions and routines for an application program's access to other resources of the compute node. The quantity and complexity of tasks to be performed by an operating system on a compute node in a massively parallel computer are typically smaller and less complex than those of an operating system on a typical stand alone computer. The operating system may therefore be quite lightweight by comparison with operating systems of general purpose computers, a pared down version as it were, or an operating system developed specifically for operations on a particular massively parallel computer. Operating systems that may usefully be improved, simplified, for use in a compute node include UNIX, Linux, Microsoft XP, AIX, IBM's i5/OS, and others as will occur to those of skill in the art.

The compute node 110 of FIG. 2 includes several communications adapters 226, 228, 230, 232 for implementing data communications with other nodes of a massively parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples example I/O node 110 for data communications to a Gigabit Ethernet 234. In Blue Gene, this communication link is only used on I/O nodes and is not connected on the compute nodes. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network 236. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 236 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: +x, −x, +y, −y, +z, and −z. The torus network logically connects the compute nodes in a lattice like structure that allows each compute node 110 to communicate with its closest 6 neighbors.

The data communications adapters in the example of FIG. 2 include a collective network or tree network adapter 232 that couples the compute node 110 for data communications to a network 240 configured as a binary tree. This network is also sometimes referred to as the collective network. Collective network adapter 232 provides data communications through three bidirectional links: two links to children nodes and one link to a parent node (not shown). The collective network adapter 232 of each node has additional hardware to support operations on the collective network.

Again referring to FIG. 2, the collective network 240 extends over the compute nodes of the entire Blue Gene machine, allowing data to be sent from any node to all others (broadcast), or a subset of nodes. Each node typically has three links, with one or two links to a child node and a third connected to a parent node. Arithmetic and logical hardware is built into the collective network to support integer reduction operations including min, max, sum, bitwise logical OR, bitwise logical AND, and bitwise logical XOR. The collective network is also used for global broadcast of data, rather than transmitting it around in rings on the torus network. For one-to-all communications, this is a tremendous improvement from a software point of view over the nearest-neighbor 3D torus network.

The collective network partitions in a manner akin to the torus network. When a user partition is formed, an independent collective network is formed for the partition; it includes all nodes in the partition (and no nodes in any other partition). In the collective network, each node contains a class routing table that is used in conjunction with a small header field in each packet of data sent over the network to determine a class. The class is used to locally determine the routing of the packet. With this technique, multiple independent collective networks are virtualized in a single physical network with one or more I/O nodes for the virtual network. Two standard examples of this are the class that connects a small group of compute nodes to an I/O node and a class that includes all the compute nodes in the system. In Blue Gene, the physical routing of the collective network is static and in the prior art the virtual network was static after being configured. As described herein, the I/O configuration mechanism (FIG. 1, 146) dynamically distributes the I/O nodes in the virtual network. Thus, while the physical routing table of the collective network is static, the virtual network can be reconfigured to dynamically redistribute the I/O nodes to the virtual networks as described herein. Alternatively, the I/O configuration mechanism could distribute the I/O nodes using hardware for a non-virtual network.

Figure 3:
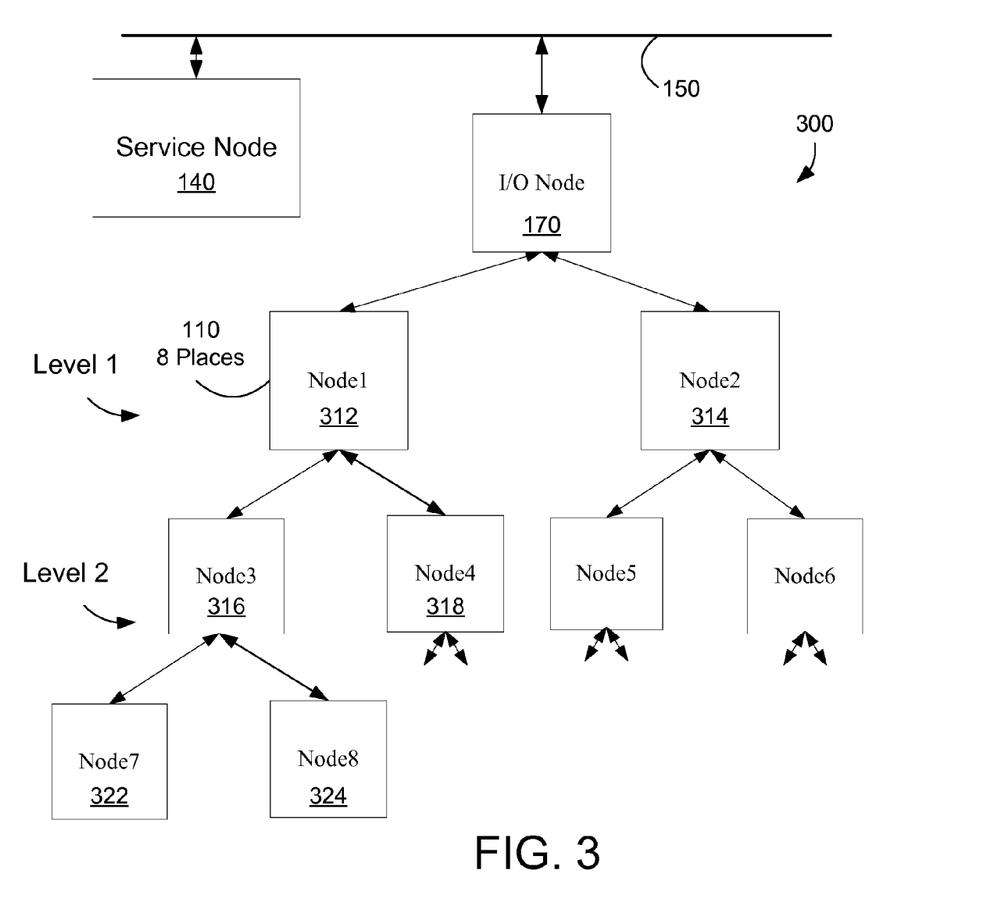
FIG. 3 shows a block diagram of a block of compute nodes to illustrate the tree network.

FIG. 3 illustrates a portion of the collective network or tree network shown as 240 in FIG. 2. The collective or tree network 300 is connected to the service node 140 through the control system network 150. The tree network 300 is a group of compute nodes 110 connected an I/O node 170 in a logical tree structure. The I/O node 170 is connected to one or more compute nodes 110. Each of the compute nodes Node1 312, and Node2 314 are connected directly to the I/O node 170 and form the top of the tree or a first level 311 for a set of nodes connected below each of Node1 312 and Node2 314. Node1 312 is the top of a tree network and has child nodes Node3 316 and Node4 318 on a second level 317. Similarly, Node3 316 has child nodes Node7 322 and Node8 324 on a third level 325. Many of the child nodes are not shown for simplicity, but the tree network 300 could contain any number of nodes with any number of levels.

Figure 4:
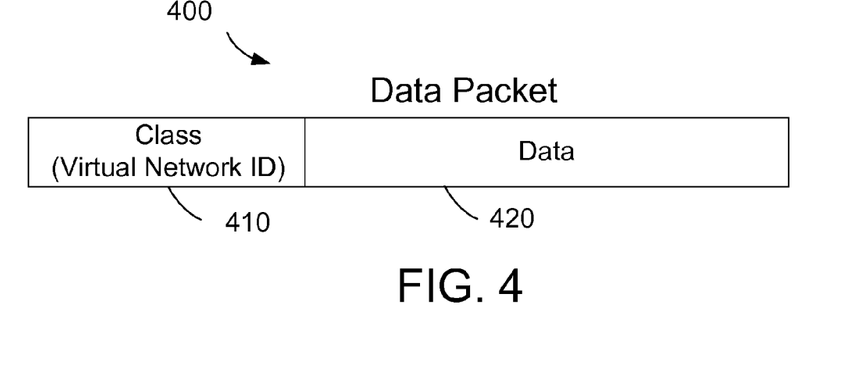
FIG. 4 shows a data packet for communicating on a collective network in a massively parallel computer system.

FIG. 4 shows a data packet 400 for communicating on the tree network 240 (FIG. 2) in a massively parallel computer system 100 (FIG. 1). Each data packet 400 includes a class 410 and data 420. The class 410 is used to determine the routing of the packet to deliver data 420 on the virtual tree network over the tree network 240. The class 410 is used in conjunction with the class routing table 221 to determine how to route the data packet 400 to the appropriate node on the tree network.

Figure 5:
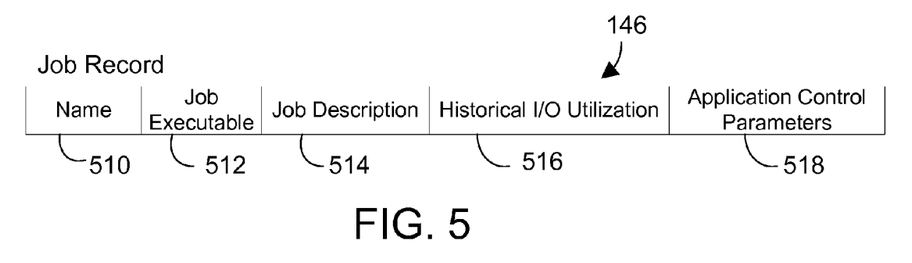
FIG. 5 shows a block diagram that represents a job record in a massively parallel computer system.

FIG. 5 shows a block diagram that represents a job record 146 in a massively parallel computer system. The job record 146 includes a name 510, the job executable 512, a job description 514, historical I/O utilization 516 and application control parameters 518. The name 510 identifies the job record that contains the record information. The job executable 512 is the code to execute the job. The job description 514 includes information about the job including information that may help determine the I/O needs of the job. The historical I/O utilization 516 contains historical information about the I/O utilization of the job that is recorded by the I/O configuration mechanism during past executions of the job. Application control parameters 518 are embedded control commands that allow a job to dictate how to set up the I/O configuration. The application control 518 may be set by a system administrator to allow the execution of the job to dictate the I/O configuration upon initial execution of the job.

Figure 6:
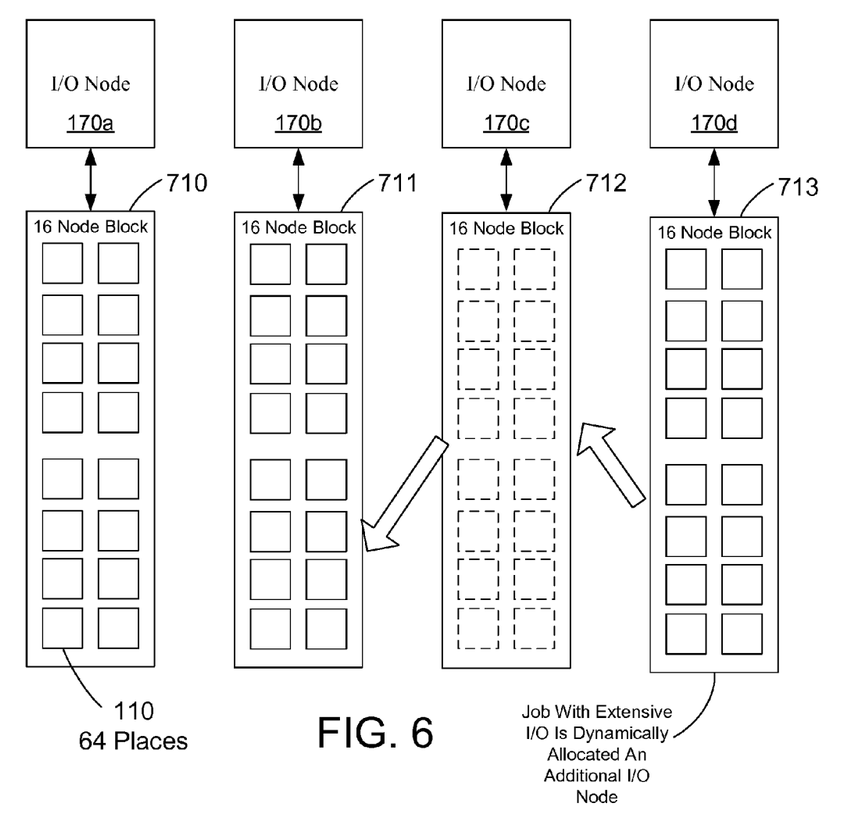
FIG. 6 is a block diagram that illustrates an example of an initial I/O node distribution in a massively parallel computer system.
Figure 7:
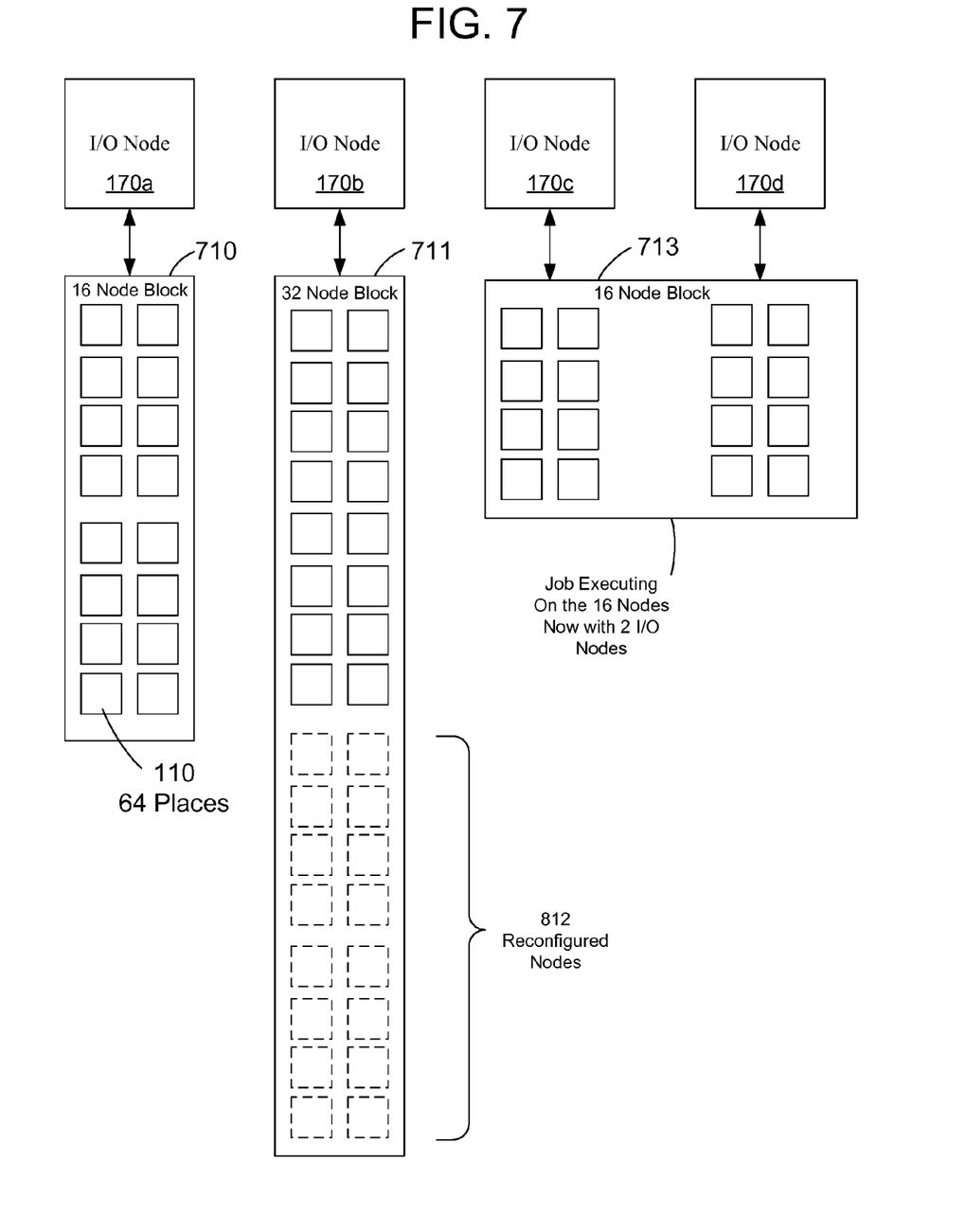
FIG. 7 is a block diagram that illustrates the example of FIG. 6 after dynamic distribution of the I/O nodes in a massively parallel computer system.

FIG. 6 and FIG. 7 illustrate an example of dynamically allocating an I/O node in a massively parallel computer system. FIG. 6 represents an initial state of a portion of a massively parallel computer system prior to dynamically allocating the I/O nodes. In this initial state, there are 4 I/O nodes 170a-170d installed on a node card (not shown) that has 64 nodes 110. In the initial state, the nodes 110 are allocated with 16 nodes in a node block 710-713 for executing a job. Each node block 710-713 has been initially configured with a single I/O node 170. The job associated with block 713 is determined to have extensive I/O needs by the I/O configuration mechanism 144 (FIG. 1). The determination of I/O needs may be determined upon loading a job, or while the job is executing as described herein. The I/O configuration mechanism may then determine to dynamically distribute an additional node to the job executing on block 713. In this example, the I/O configuration mechanism determines to distribute the nodes associated with block 712 to block 711 to free up an I/O node 170c and then distribute this I/O node 170c to the node block 713 needing the additional I/O capability. The result of this dynamic distribution is illustrated in FIG. 7 where the 16 nodes in node block 713 are now configured with 2 I/O nodes 170c, 170d. The nodes that were previously configured to node block 712 have be re-configured 812 with node block 711.

As illustrated in the above example, the I/O configuration mechanism dynamically distributes I/O nodes to blocks of compute nodes in a massively parallel computer system. In the previous example, the determination to distribute an additional I/O node to the node block may have been based on data in the job record or by real-time I/O needs determined by monitoring the job execution. For example, upon loading the job, the I/O configuration mechanism could have detected from the job description that the job has extensive I/O needs and then distributed the additional I/O node from a block that has less I/O demands or is not being used. Second, the historical I/O utilization 516 may have indicated that the job typically requires a large amount of I/O resources and thus would execute more efficiently with an additional I/O node. Third, the I/O configuration mechanism may have determined from the job record that the application will assert control with application control parameters 518 (FIG. 5). The application control parameters 518 indicate how the application wishes to assert control over the I/O configuration mechanism. For example, the application control parameters may indicate a priority or an number of I/O nodes that are required. Finally, the I/O configuration mechanism may dynamically distribute the I/O nodes based on real-time monitoring of the I/O needs of the job while it is executing. The I/O needs may be monitoring by looking a performance metrics such as the number of I/O operations performed by the I/O node for the job, network latency, overall network loading, etc. When the performance metrics indicate the I/O demand is above an established threshold, then the I/O configuration mechanism will attempt to dynamically update the I/O configuration to distribute additional I/O nodes to the job.

Figure 8:
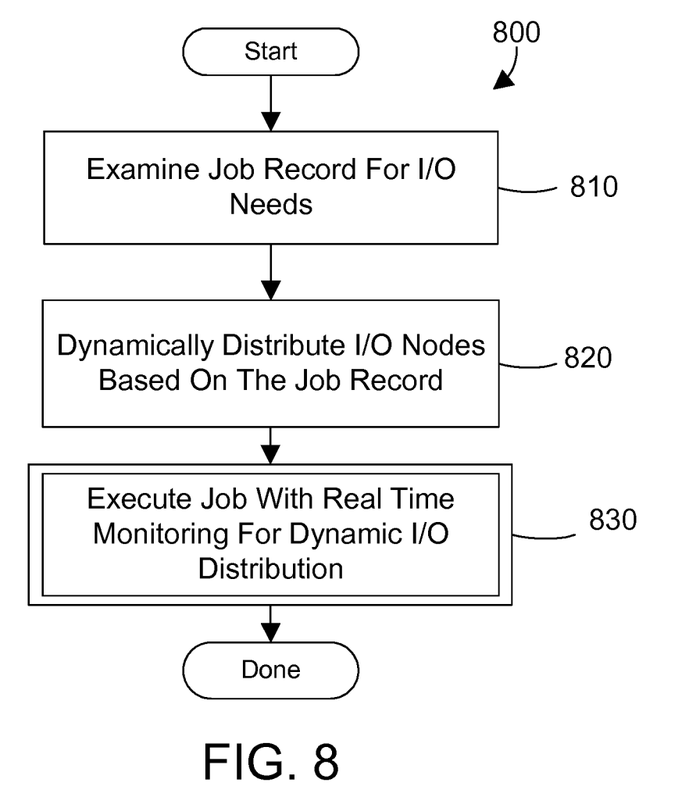
FIG. 8 is a flow diagram of a method for dynamic I/O node redistribution on a massively parallel computer system.

FIG. 8 shows a method 800 for dynamic distribution of compute nodes versus I/O nodes on a multi-node computing system. The steps in method 800 are preferably performed by an I/O configuration mechanism 146 in the service node 140 (FIG. 1). First, the I/O configuration mechanism 146 loads a first job record 144 from the data storage 138 and examines the job record for I/O needs of the job (step 810). Next, the method dynamically distributes I/O nodes based on the job record (step 820). The information in the job record that is used for dynamically allocating the jobs may include the job description, job execution history and application control parameters as described above. Then the method executes the job on the nodes while real-time monitoring for dynamic I/O node configuration (step 830). The method is then done.

Figure 9:
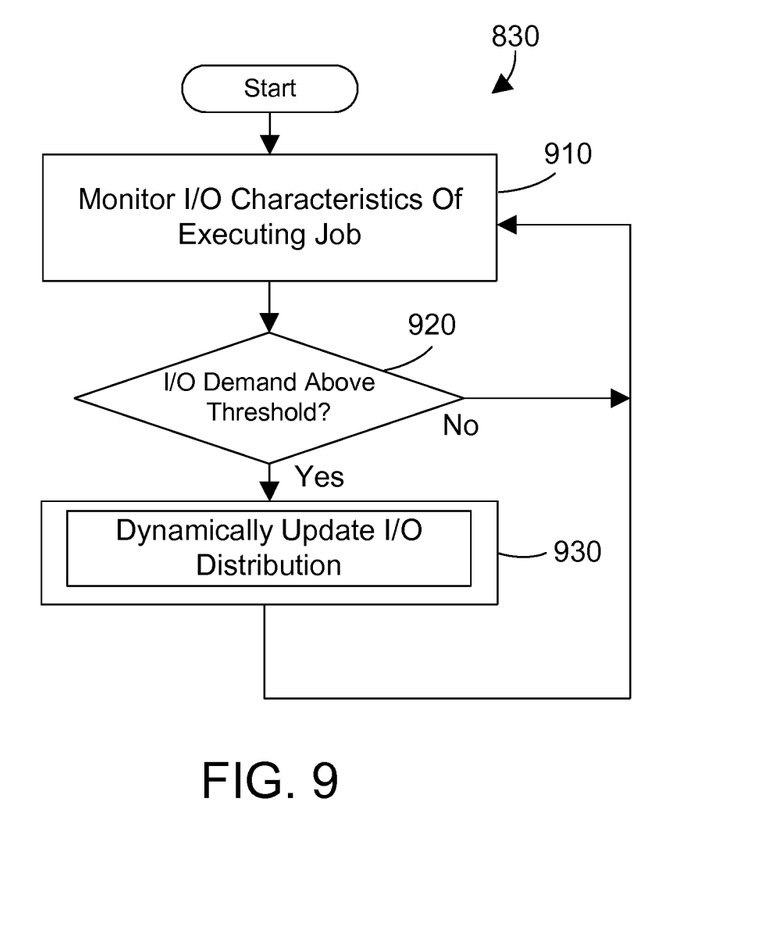
FIG. 9 is a method flow diagram that illustrates one possible implementation of step 830 in FIG. 8.

FIG. 9 shows a method 900 for selecting the nodes to execute a job on a massively parallel computer system as an exemplary implementation of step 830 in method 800. The method first monitors the I/O characteristics of the executing job (step 910). If the I/O characteristics indicate the I/O demand is not above a threshold (step 920=no) then continue monitoring any executing jobs (step 910). If the I/O characteristics indicate the I/O demand is above a threshold (step 920=yes) then dynamically update the I/O configuration of the nodes executing the job (step 930) and continue monitoring any executing jobs (step 910). The method may operate continuously or be terminated by the I/O configuration mechanism.

Figure 10:
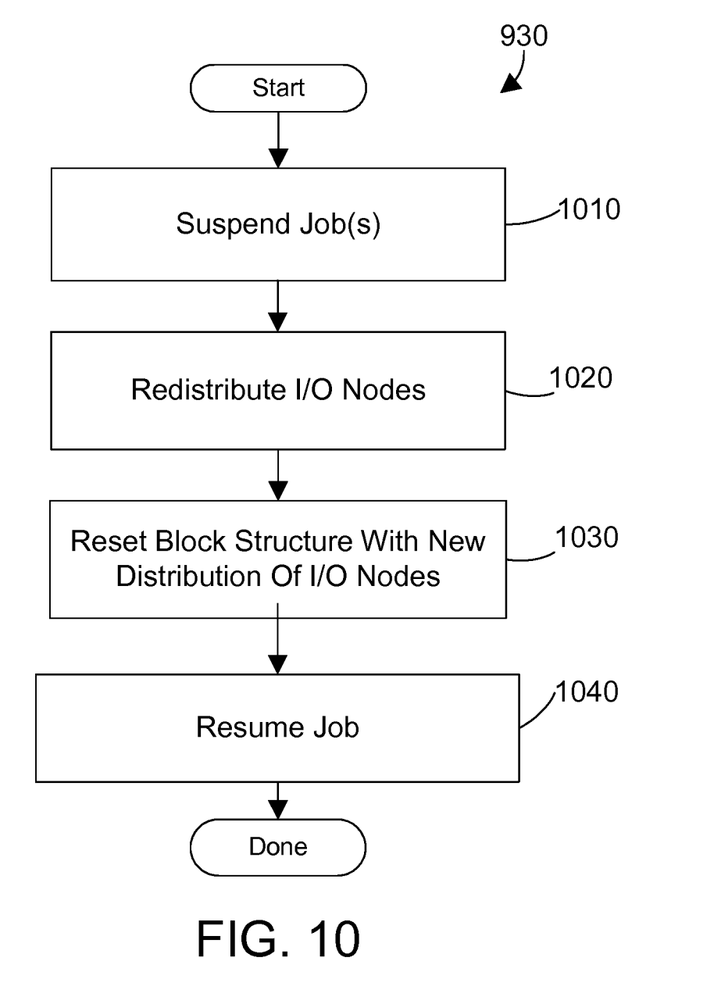
FIG. 10 is a method flow diagram that illustrates one possible implementation of step 930 in FIG. 9.

FIG. 10 shows a method for selecting the nodes to execute a job on a massively parallel computer system as an exemplary implementation of step 930 in method 900. The method first suspends all jobs executing on the blocks of nodes to be redistributed (step 1010). The method then redistributes I/O nodes among blocks of nodes that are executing jobs on the multi-node computer system (step 1020). Then the method resets the block structure with the new allocation of I/O nodes (step 1030). The method can then resume the job that was suspended (step 1040). The method is then done.

An apparatus and method is described herein to dynamically distributes I/O nodes on a multi-node computing system. The I/O configuration mechanism monitors the I/O performance of the executing job to then dynamically redistribute the I/O node distribution based on the I/O performance of the executing job to increase the multi-node computer system.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A multi-node computer system comprising:
   a plurality of compute nodes that each comprise a processor and memory;
   a plurality of input/output (I/O) nodes comprising a processor connected to the plurality of compute nodes, wherein the I/O nodes are connected to the compute nodes with a virtual network operating on a physical network and the I/O nodes communicate with a service node to provide I/O communication to network resources;
   wherein a block of compute nodes from the plurality of compute nodes is configured to execute a job, and the block of compute nodes has a number of associated I/O nodes that form a ratio of I/O nodes to compute nodes; and
   wherein the system is configured to dynamically adjust the ratio of I/O nodes to compute nodes based on I/O characteristics of the job executing on the block of compute nodes by dynamically configuring the virtual network, wherein the I/O characteristics of the job are determined by real-time monitoring of the job's I/O characteristics.

2. The multi-node computer system of claim 1 wherein the multi-node computer system is a massively parallel computer system.

3. The multi-node computer system of claim 1 wherein the I/O configuration mechanism dynamically updates the ratio by suspending the job and re-allocating additional nodes of the plurality of I/O nodes to be associated with the executing job.

4. The multi-node computer system of claim 1 wherein the I/O characteristics of the job are determined from information stored in a job record selected from the following: job description, historical I/O utilization, and application control parameters.

5. The multi-node computer system of claim 4 wherein the I/O characteristics of the job are used for the initial ratio of input nodes to compute nodes upon beginning execution of the job.

6. The multi-node computer system of claim 1 wherein the block of compute nodes are arranged in a virtual tree network and the I/O node connects to the top of the tree network to allow the block of compute nodes to communicate with the service node of a multi-node computer system.

7. The multi-node computer system of claim 6 wherein the virtual tree network is determined by a class routing table on the node.

8. An article of manufacture comprising:
   an I/O configuration mechanism that adjusts a ratio of a plurality of input/output (I/O) nodes to a plurality of compute nodes in a multi-node computer system for a job executing on the plurality of compute nodes, wherein the plurality of I/O nodes provide communication to network resources and the plurality of I/O nodes are connected to the plurality of compute nodes with a virtual network operating on a physical network, wherein the I/O configuration mechanism dynamically adjusts the ratio by dynamically configuring the virtual network based on I/O characteristics of the job, wherein the plurality of compute nodes and the plurality of I/O nodes each comprise a processor and memory, wherein the I/O characteristics of the job are determined by real-time monitoring of the job's I/O characteristics, wherein the I/O configuration mechanism dynamically updates the ratio by suspending the job and re-allocating additional nodes of the plurality of I/O nodes to be associated with the executing job; and non-transitory computer recordable media bearing the I/O configuration mechanism.

9. The article of manufacture of claim 8 wherein the I/O characteristics of the job are determined from information stored in a job record selected from the following: job description, historical I/O utilization, and application I/O control.

10. The article of manufacture of claim 8 wherein the I/O characteristics of the job are used for the initial ratio of input nodes to compute nodes upon beginning execution of the job.

11. The article of manufacture of claim 8 wherein the plurality of compute nodes are arranged in a virtual tree network and further comprising an I/O node that connects to the top of the tree network to allow the compute nodes to communicate with a service node of a massively parallel computer system.

12. The article of manufacture of claim 11 wherein the virtual tree network is determined by a class routing table in the node.

\* \* \* \* \*